(No Model.)

S. A. BAILEY.
Crank Fastening.

No. 242,176.                    Patented May 31, 1881.

Attest:
H. L. Permie.
H. J. Bailey.

Inventor:
S. A. Bailey,
By F. C. Somes
Attorney.

UNITED STATES PATENT OFFICE.

SELDEN A. BAILEY, OF WOONSOCKET, RHODE ISLAND, ASSIGNOR TO ROSS C. BROWNING, OF ORANGE, NEW JERSEY.

CRANK-FASTENING.

SPECIFICATION forming part of Letters Patent No. 242,176, dated May 31, 1881.

Application filed November 13, 1880. (No model.)

*To all whom it may concern:*

Be it known that I, SELDEN A. BAILEY, a citizen of the United States, residing at Woonsocket, in the Providence Plantations and State of Rhode Island, have invented certain new and useful Improvements in Crank-Fastenings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to cranks which are attached to the shafts which they are designed to operate by means of screw-threads formed on the end of the shaft and in the eye of the crank. This method of attaching cranks to their shafts is generally adopted in clothes-wringers, for the reason that it is a very economical one, saving the expense of squaring the eye of the crank and of reducing and squaring the end of the shaft, and for the additional reason that it enables the crank to gain a peripheral hold upon the shaft, and does not impair the strength of the latter.

The invention relates to means for enabling the crank to be turned in either direction, when attached in this manner, without liability of being turned off.

Figure 1:
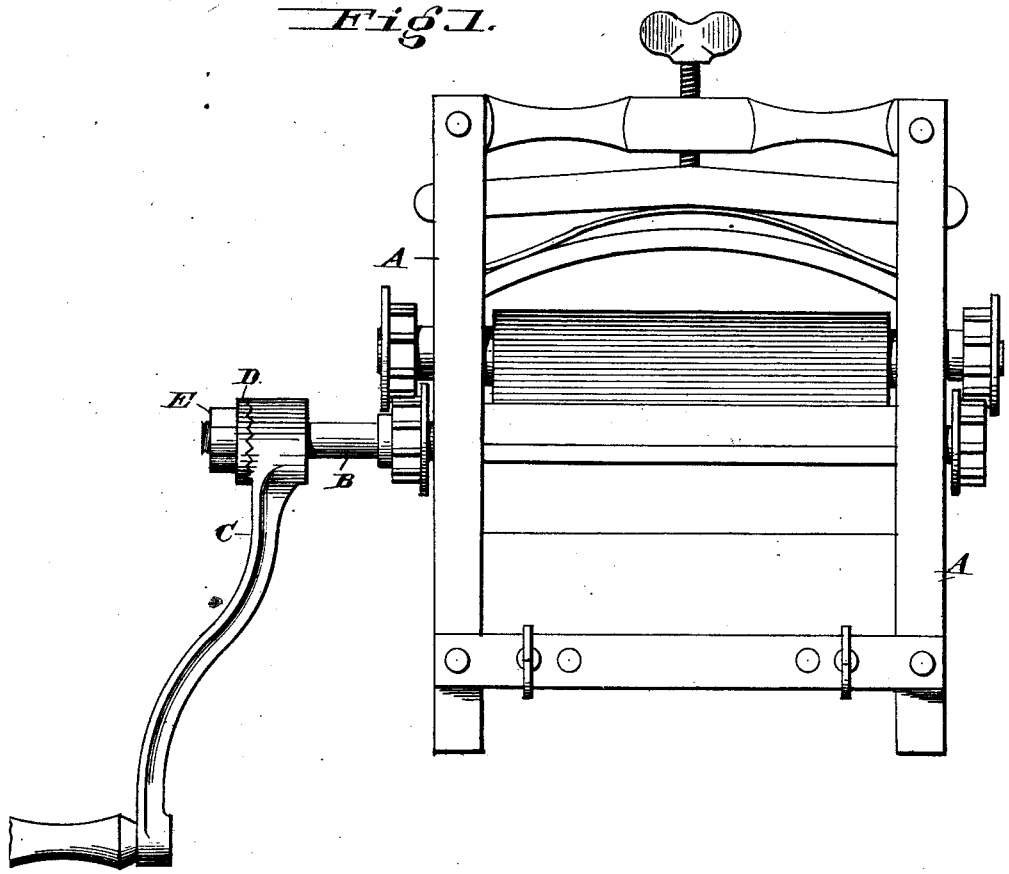
Figure 2:
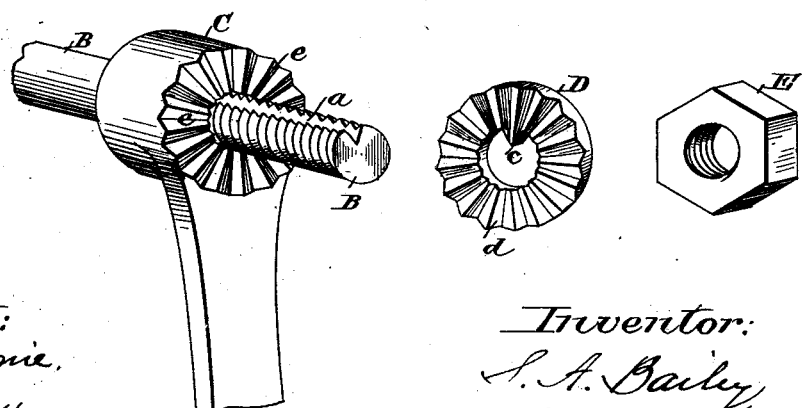

In the drawings, Figure 1 is an elevation of a clothes-wringer having this improvement. Fig. 2 is a perspective view of the several parts detached.

The invention is here shown as applied to a rubber-roll clothes-wringer, A, which may be of any ordinary construction. The shaft B of the lower roll is extended at one end in the ordinary manner beyond that of the upper roll, whereby it is adapted to receive the crank C and form the driving-shaft of the machine. The shafts of the two rolls may or may not be connected by cog-wheels. The shaft B is preferably of uniform diameter throughout, and is provided at its outer end with an external screw-thread adapted to fit an internal screw-thread in the eye of the crank. A longitudinal groove, *a*, is cut in the threaded end of this shaft.

A washer, D, having an internal projection, *c*, is made to slide over the shaft, the projection *c* fitting into the groove *a*. The inner face of this washer is provided with corrugations *d*, which match with corresponding corrugations *e*, on the outer face of the crank-hub. These corrugations, preferably angular in cross-section, may be arranged radially, or they may be otherwise arranged, provided they be not concentric with the shaft when the washer is in position. After the crank is turned on the washer D is slipped over the end of the shaft and the nut E turned on over the washer. The inward projection on the washer, fitting into the groove in the shaft, prevents the washer from turning, and by means of the washer the crank and nut are kept from contact with each other. The corrugations on the washer and crank cause an interlocking of said parts and prevent backlash when the crank is turned back. A driving pulley or wheel may be fastened to its shaft in like manner.

In the operation of the machine, the crank being turned onto the end of the screw-thread, or to a projection or shoulder, necessarily carries the shaft with it when rotated forward. When rotated backward it also carries the shaft and operates the machine, being prevented from turning off by means of the washer and groove aforesaid held in place by the nut.

What is claimed as the invention is—

The combination, with a rotary shaft screw-threaded at one end and provided with a longitudinal groove, of a crank and washer meshing together, as described, said crank being provided with a screw-threaded eye adapted to fit said shaft, and said washer having an inward projection fitting into said groove, and a nut for holding the parts in place, substantially as described.

In testimony whereof I affix my signature in presence of two witnesses.

S. A. BAILEY.

Witnesses:
 GEO. W. CATE,
 TIMOTHY P. MORRILL.